(12) United States Patent
Lu et al.

(10) Patent No.: US 9,427,886 B2
(45) Date of Patent: Aug. 30, 2016

(54) LOG SPLITTER HYDRAULIC CYLINDER RESET SPRING DEVICE

(75) Inventors: Yuxin Lu, Jiaxing (CN); Zhongcheng Peng, Jiaxing (CN); Laichao Lu, Jiaxing (CN)

(73) Assignee: Jiashan Superpower Tools Co., Ltd, Jiaxing (CN)

( * ) Notice: Subject to any disclaimer, the term of this patent is extended or adjusted under 35 U.S.C. 154(b) by 1081 days.

(21) Appl. No.: 13/466,054

(22) Filed: May 7, 2012

(65) Prior Publication Data

US 2012/0280440 A1    Nov. 8, 2012

Related U.S. Application Data

(60) Provisional application No. 61/483,617, filed on May 6, 2011.

(30) Foreign Application Priority Data

May 5, 2011  (CN) .......................... 2011 2 0139556

(51) Int. Cl.
| | |
|---|---|
| F16F 1/06 | (2006.01) |
| B27L 7/00 | (2006.01) |
| B27L 7/06 | (2006.01) |
| F15B 15/14 | (2006.01) |

(52) U.S. Cl.
CPC .. B27L 7/00 (2013.01); B27L 7/06 (2013.01); F15B 15/1476 (2013.01); F16F 1/06 (2013.01)

(58) Field of Classification Search
CPC ............ B27L 7/00; B27L 7/005; B27L 7/06; B27L 7/08; F16F 1/024; F16F 1/12; F16F 1/126; F16F 1/128; F16F 3/04; F16F 3/00; F16F 3/02; F16F 1/041; F16F 1/06; F15B 15/226; F15B 15/1476
See application file for complete search history.

(56) References Cited

U.S. PATENT DOCUMENTS

| | | | | | |
|---|---|---|---|---|---|
| 2,421,858 | A | * | 6/1947 | Trimbach | 89/44.01 |
| 2,598,017 | A | * | 5/1952 | Rockwell | 89/44.02 |
| 3,077,214 | A | * | 2/1963 | Brukner | 144/193.1 |
| 3,948,498 | A | * | 4/1976 | Hirano | 267/35 |
| 4,079,951 | A | * | 3/1978 | Sievenpiper | 277/468 |
| 4,116,251 | A | * | 9/1978 | Graney | 144/193.1 |
| 4,331,192 | A | * | 5/1982 | Hung | 144/195.1 |
| 4,411,299 | A | * | 10/1983 | Alcott | 144/193.1 |
| 4,630,659 | A | * | 12/1986 | Warthen | 144/193.1 |
| 2011/0168007 | A1 | * | 7/2011 | Binek | 89/43.01 |

FOREIGN PATENT DOCUMENTS

DE              248         *   8/1877

OTHER PUBLICATIONS

Machine Translation of DE 248 (no date).*

* cited by examiner

*Primary Examiner* — Nicholas J Lane
(74) *Attorney, Agent, or Firm* — Intellectual Property Law Group LLP

(57) ABSTRACT

A reset spring device for a one-log splitter single-action hydraulic cylinder comprises a spring guide, reset spring, bearing, curved transmission lever, and guide seal. The spring guide has a first end and second end, the reset spring housed within the spring guide, the bearing housed within a portion at the first end, the spring abutting the bearing, the guide seal disposed at the first end of the guide, the transmission lever positioned outside the spring guide and engaged with the bearing. The transmission lever having a curved protrusion operably engaged through a longitudinal opening on the spring guide and through a groove on the bearing. A push plate is connected to the lever. During operation, when a cylinder is pushing forward, the lever compresses the spring through the bearing; and when a handle is released, the log splitter ceases operating, the cylinder is reset by each reset spring device.

8 Claims, 6 Drawing Sheets

LOG SPLITTER HYDRAULIC CYLINDER RESET SPRING DEVICE

CROSS-REFERENCE TO RELATED APPLICATIONS

This application claims benefit to U.S. Provisional patent application No. 61/483,617 filed on May 6, 2011; and claims foreign priority under 35 U.S.C. §119 to Chinese Patent Application no. 201120139556.0, filed in the People's Republic of China on May 5, 2011. The entire content of each of these applications is hereby incorporated by reference for all purposes.

TECHNICAL FIELD

This invention relates to an electric or motorized log splitter hydraulic cylinder reset spring device. In particular, the present invention relates to the reset of a one-log splitter single-action hydraulic cylinder.

BACKGROUND

There are many types of log splitters, including manual, pneumatic, electric, and motorized log splitters, which are widely used in the European, American and Australian logging industries. Wood is a green sustainable energy source, and these countries use wood as a source of heating. Therefore, many farms and families need and use log splitters. Currently, domestic-made and foreign-made log splitters usually have a power unit, control valve, driving cylinder and beam. The driving cylinder may be a single-acting cylinder or a double-acting cylinder. Generally, the cylinder of a small log splitter has a small diameter, low resetting power, and is a single-acting cylinder. The reset is caused by a large spring on a piston rod inside the cylinder. Because a big log splitter has a bigger size and requires a higher resetting power, a single-acting cylinder cannot finish the stroke and reset at the same time. Therefore, a big log splitter usually has a double-acting cylinder.

Accordingly, there is a need for performing the reset in a big log splitter, even with a single-acting cylinder, in a cost effective manner. There is a need for simplifying the manufacturing process, lowering manufacturing costs as well as lowering operating costs of the log splitter.

SUMMARY

The reset spring device according to an embodiment of the present invention, not only performs the reset in a big log splitter but also reduces the length of the cylinder, which reduces the manufacturing cost of the log splitter. When the log splitter has a single-acting cylinder, a normal 3-way 2-position valve can be used as the control vale instead of the 4-way 3-position valve, which reduces the cost of the control valve. During the operation of the log splitter, the reset of the cylinder is performed by the spring, not the electric power, which reduces the operating cost. Therefore, the reset spring device according to an embodiment of the present invention, has wide usage in log splitters.

According to an embodiment of the present invention, there is a log splitter hydraulic cylinder reset spring device comprising: a spring guide, reset spring, a bearing, curved transmission lever, and a guide seal. The spring guide has a first end and a second end, the reset spring housed within the spring guide, the bearing housed within a portion at the first end of the spring guide and the spring abutting the bearing, the curved transmission lever positioned outside the spring guide and engaged with the bearing.

In an embodiment, there is a log splitter hydraulic cylinder reset spring device comprising: a cylindrical spring guide having a longitudinal opening, a reset spring housed within the spring guide, a bearing housed within the spring guide and abutting the reset spring, the bearing having a groove on an outer surface of the bearing, a guide seal disposed at a first end of the spring guide, a curved transmission lever disposed outside the spring guide and having a protrusion operably engaged through the longitudinal opening and through the groove of the bearing housed within the spring guide, and a push plate connected to the transmission lever.

These features, advantages and other embodiments of the present invention are further made apparent, in the remainder of the present document, to those of ordinary skill in the art.

BRIEF DESCRIPTION OF THE DRAWINGS

To further describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more example embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

An object of one aspect of the invention is to provide a reset spring device to a log splitter, to simplify the manufacturing process and to largely reduce the overall manufacturing and operating costs of the log splitter.

Figure 1:
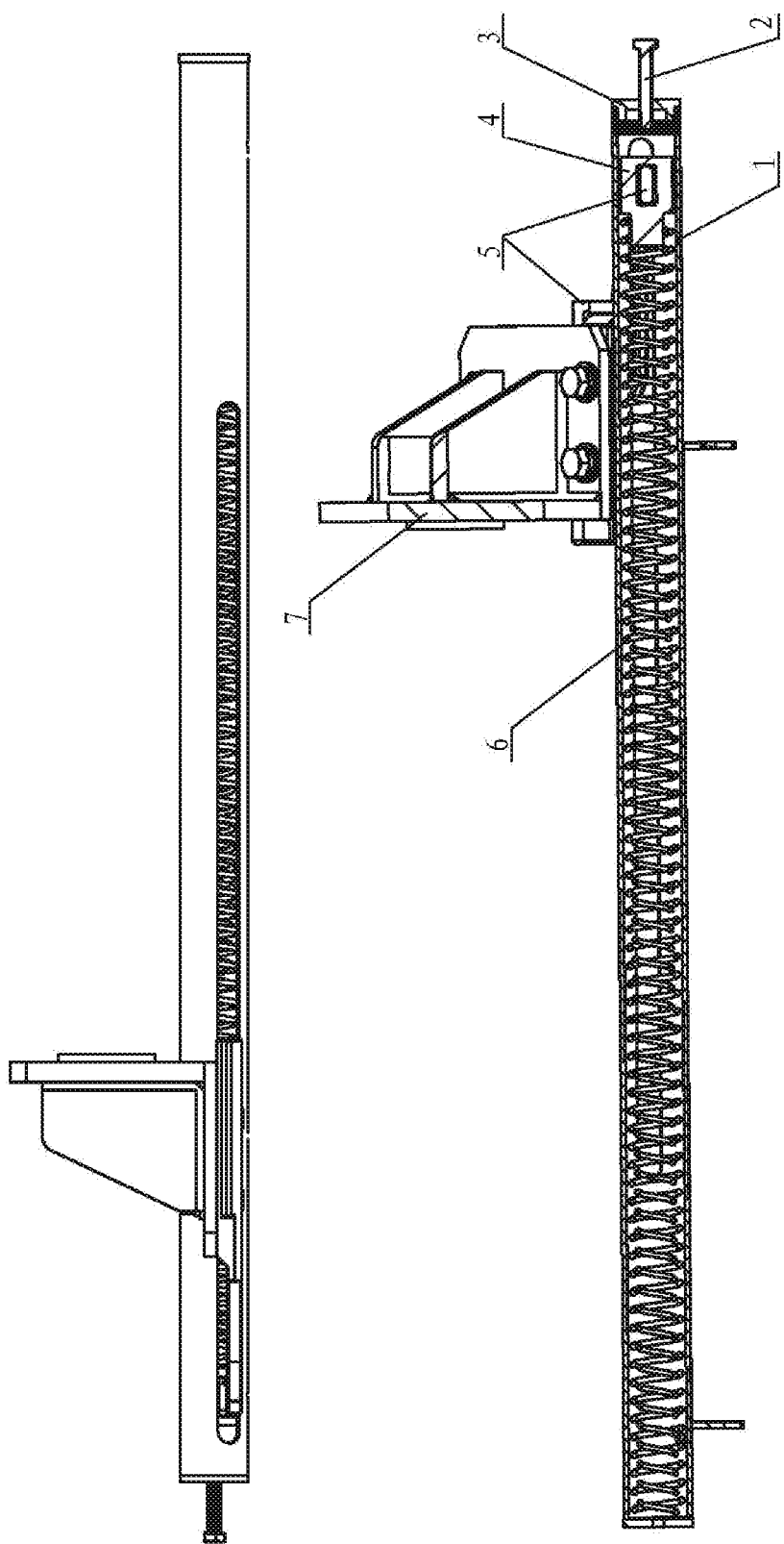
FIG. 1 is a structural side view of the device and a perspective partial cross-section of the device, according to an embodiment of the present invention.
Figure 6:
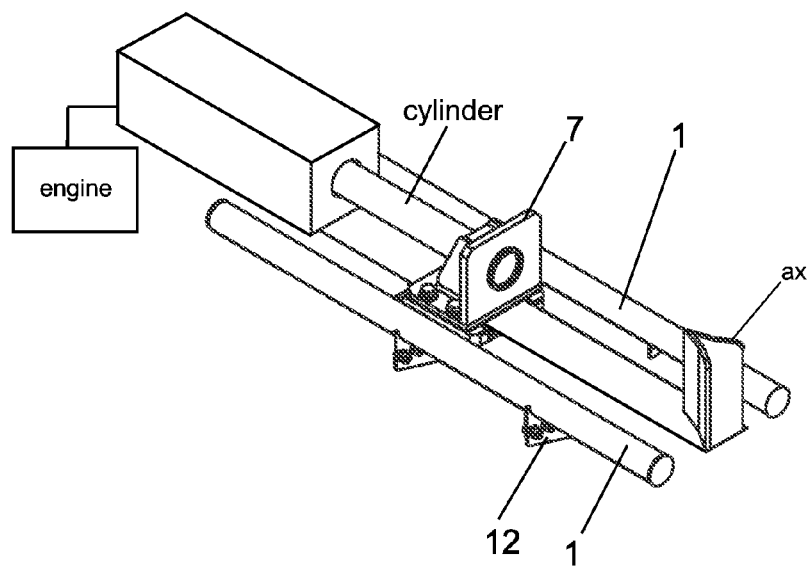
FIG. 6 is a perspective view of a log splitter hydraulic cylinder reset spring device installed on each side of a log splitter, according to an embodiment of the present invention.
Figure 7:
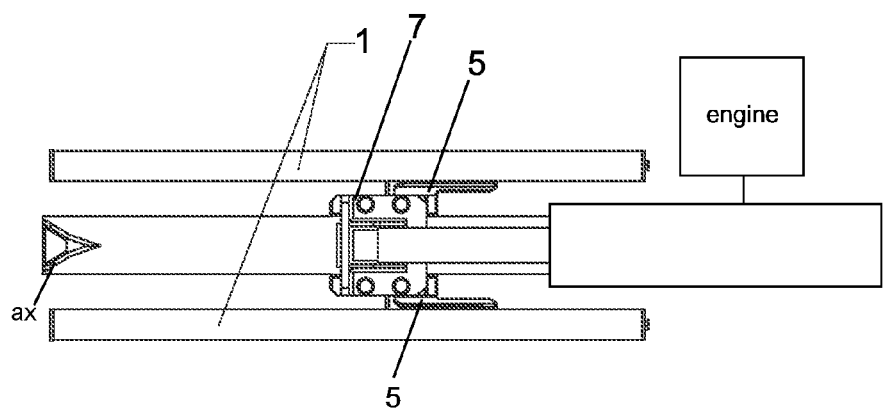
FIG. 7 is a top plan view of FIG. 6.

As illustrated in FIG. 1, to carry out the objects of the invention there is provided a log splitter hydraulic cylinder reset spring device comprising a spring guide 1, an adjustment screw 2, a guide seal 3, a bearing 4, a curved transmission lever 5, a reset spring 6, and a push plate 7, according to an embodiment of the present invention. This reset spring device is installed symmetrically on both sides of the log splitter ax and at the same time, the device serves as a guard. This configuration is shown in FIGS. 6 and 7 illustrating a pair of reset spring devices installed on the log splitter.

Figure 2:
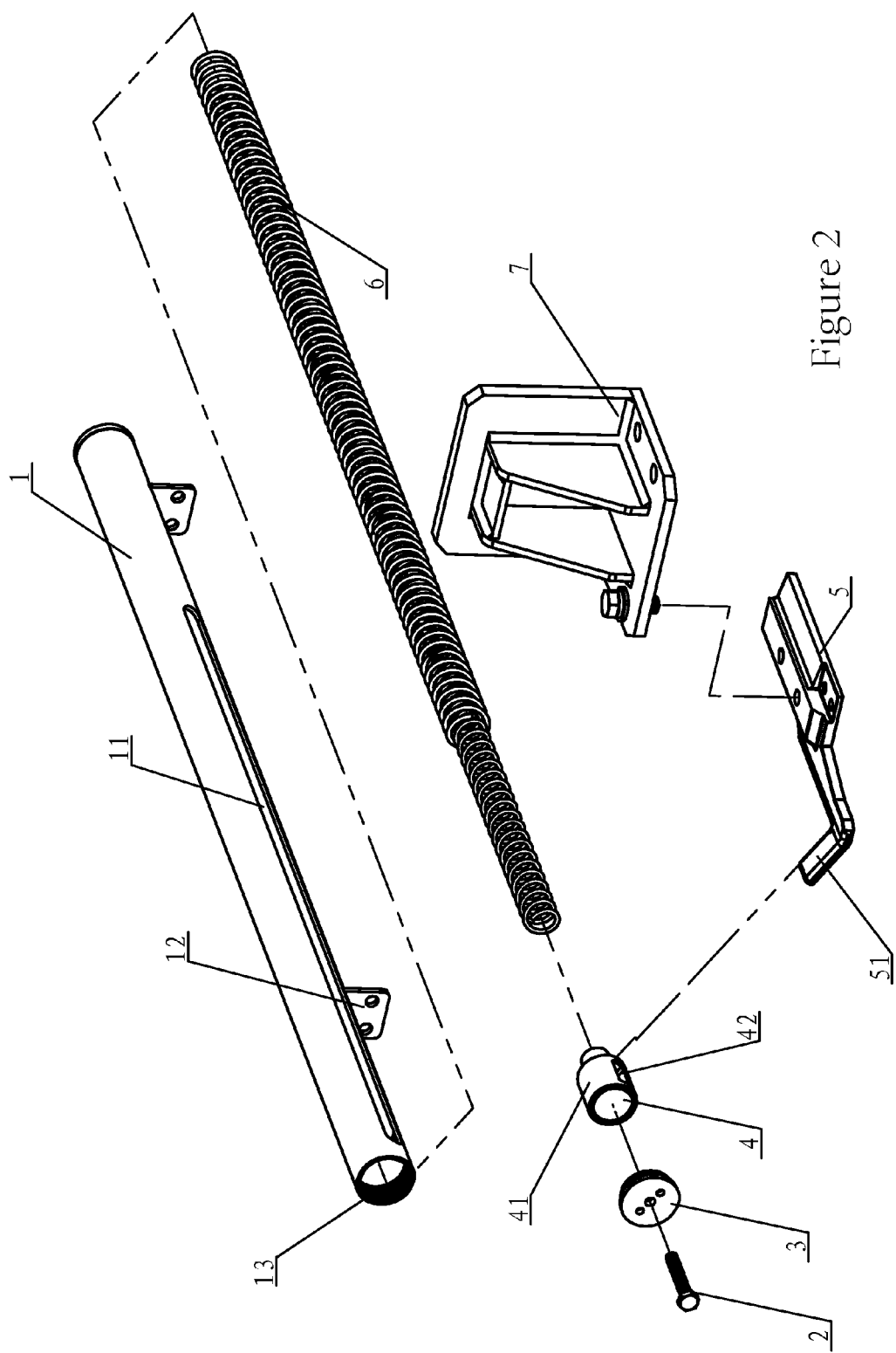
FIG. 2 is an exploded view of the device and its operation on a log splitter, according to an embodiment of the present invention.
Figure 3:
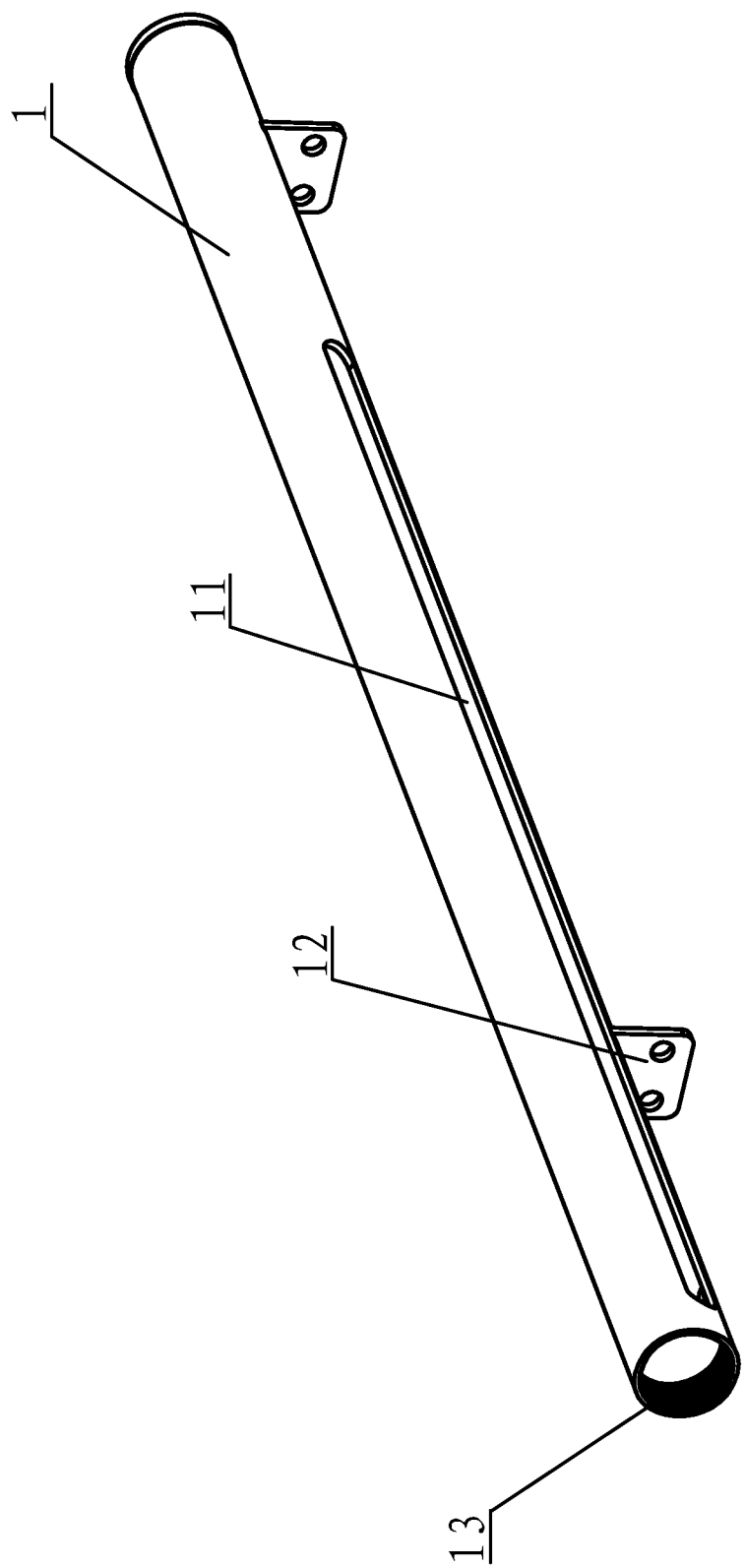
FIG. 3 is a perspective view of the spring guide of the device, according to an embodiment of the present invention.

As shown in FIG. 2 and FIG. 3, one side end of the spring guide 1 is sealed; a long groove 11 or aperture is provided on the spring guide 1 on an outside surface of the spring guide 1; the opposing side end of the spring guide 1 has screw thread 13; and a plurality of fixed linking wings 12 are provided on an outside surface of the spring guide 1. The adjustment screw 2 is engaged upon the guide seal 3, which is disposed within the threaded end 13 of the spring guide 1. The reset spring 6 can be one single spring or a combined spring made of several springs.

Figure 4:
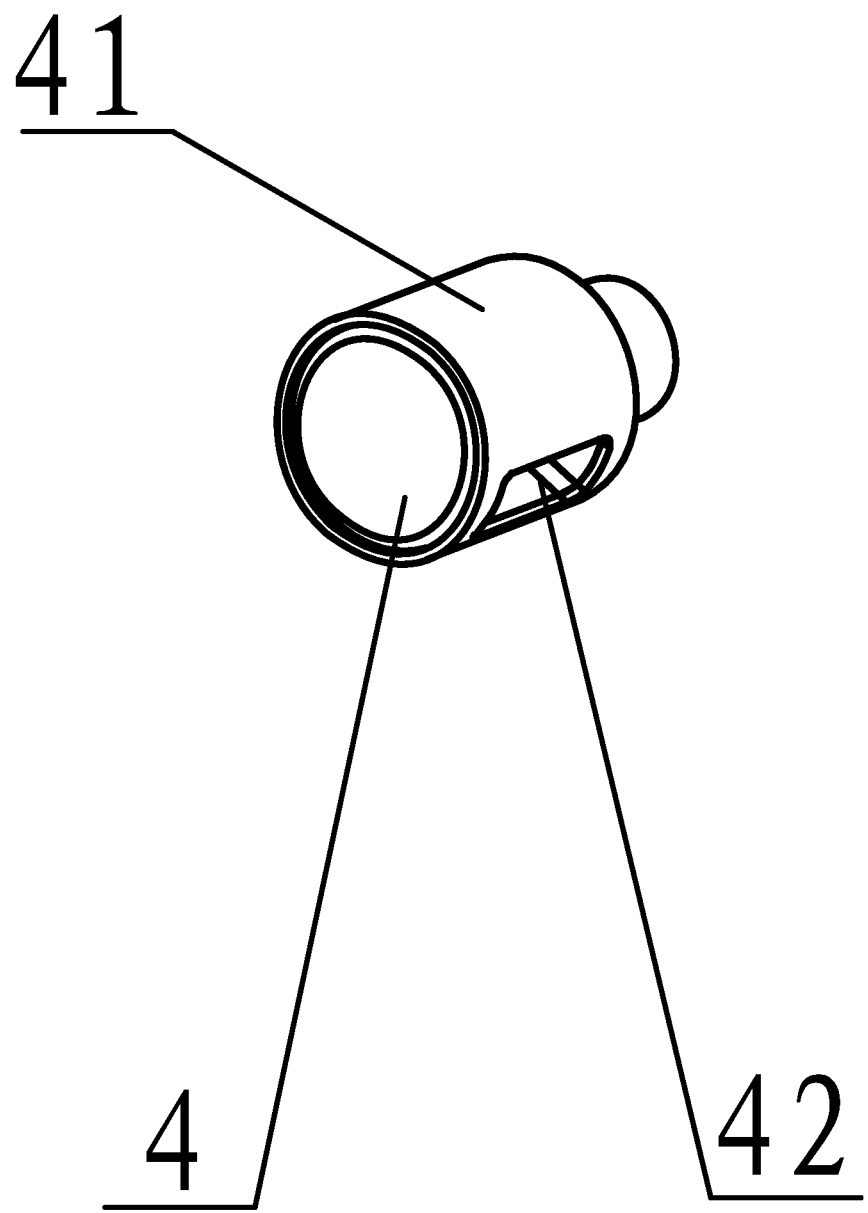
FIG. 4 is a perspective view of the bearing of the device, according to an embodiment of the present invention.

As illustrated in FIG. 3 and FIG. 4, the head of bearing 4 is inserted into the spring guide 1 as a spring retainer; an end edge/surface of the bearing has a transmission groove or aperture 42; and the peripheral/circumferential surface of the end of the bearing is covered with a nylon sliding ring 41.

Figure 5:
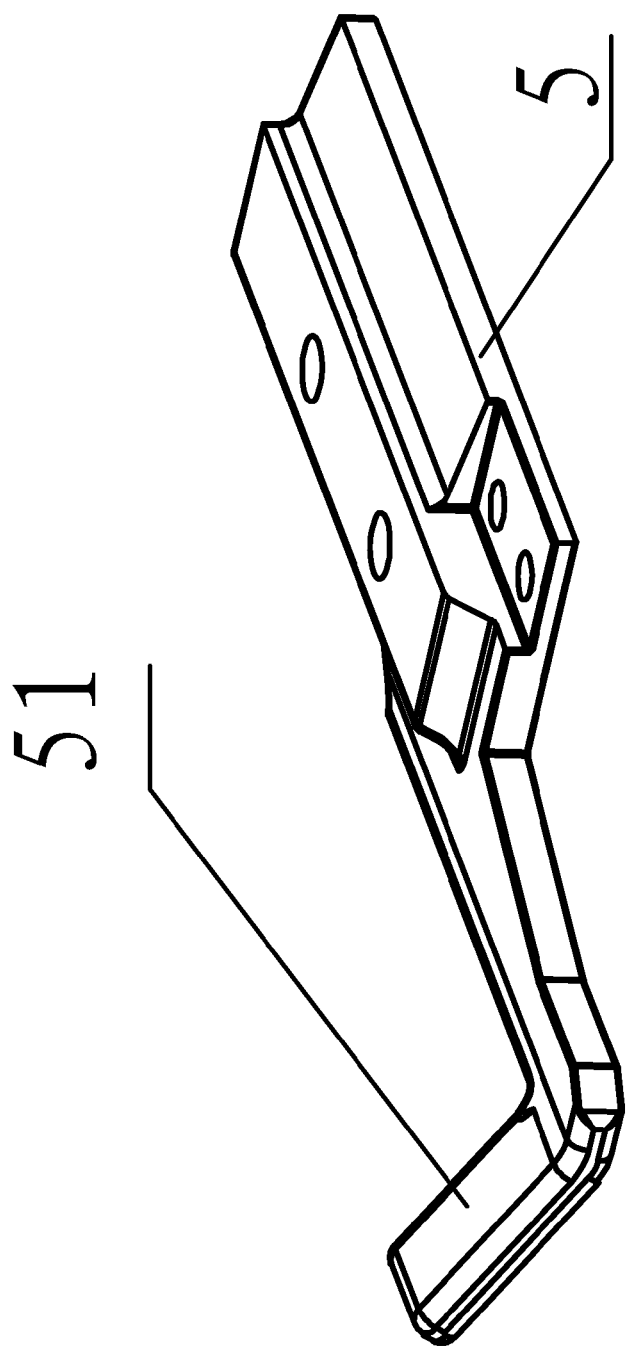
FIG. 5 is a perspective view of the transmission lever of the device, according to an embodiment of the present invention.

As illustrated in FIG. 5, one side of the curved transmission lever 5 is fixed and connected to push plate 7, the other side has a curved projection 51 which is inserted and encased in the transmission groove 42 of the bearing 4 as shown in FIG. 1 and FIG. 2.

As shown in FIG. 6, this reset spring device is installed symmetrically on both sides of the log splitter ax; and is fixed to the log splitter beam by fixed linkage wing 12, and at the same time, the device serves as a guard.

Through the above embodiments, the present invention comprises the following features: during operation, when the cylinder is pushing forward, the curved transmission lever 5 further compresses the spring 6 through bearing 4 and may travel along the respective groove 11 of the spring guide 1; when the handle is released and the log splitter is not operating, the cylinder is reset by the two sets of reset spring devices, one device being on each side of the log splitter ax. By this design, the length of the spring guide 1 and curved transmission lever 5, and the size of the spring guide 1 can be adjusted to achieve different strokes and reset power based on the specific job requirements regardless of the size of the cylinder. Therefore the device can be used in different sized log splitters.

As shown in FIG. 2 and FIG. 4, the bearing 4 has a flanged section on the side facing the spring 6 when installed in the spring guide 1, such that the spring abuts the bearing 4 securely. As further shown in FIG. 2, a larger diameter spring may envelop another smaller diameter spring.

According to an embodiment of the present invention the curved transmission lever 5, of the log splitter hydraulic cylinder reset spring device, is made from pressing a steel sheet. One side of the curved transmission lever 5 is fixed and connected to a push plate 7, such as by a screw connection, and another side of the lever has a curved projection 51, which is enclosed within the transmission groove 42 of bearing 4. The projection 51 protrudes perpendicularly to the length of the push plate 7. See FIG. 7 which illustrates the connection of the push plate 7 on each side to a curved transmission lever 5 of a respective reset spring device.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A log splitter hydraulic cylinder reset spring device comprising:
   a cylindrical spring guide having a longitudinal opening,
   a reset spring housed within the spring guide,
   a bearing housed within the spring guide and abutting the reset spring, the bearing having a groove on an outer surface of the bearing,
   a guide seal disposed at a first end of the spring guide,
   a curved transmission lever disposed outside the spring guide and having a protrusion operably engaged through the longitudinal opening and through the groove of the bearing housed within the spring guide, and the transmission lever configured to connect with a push plate;
   wherein the reset spring device and a second reset spring device are installed symmetrically on a respective side of a log splitter ax, such that the push plate is positioned between the reset spring devices; and each reset spring device simultaneously functions as a guard.

2. The device according to claim 1, wherein the first end is internally threaded and a second end of the spring guide is sealed.

3. The device according to claim 1, further comprising a plurality of fixed linking wings disposed on an outside surface of the spring guide.

4. The device according to claim 1, wherein the reset spring comprises a single spring or a combination spring made of a plurality of springs.

5. The device according to claim 1, wherein the bearing comprises a flange retaining the spring.

6. The device according to claim 1, further comprising a nylon sliding ring surrounding a peripheral surface of the bearing.

7. The device according to claim 1, wherein the curved transmission lever is made from a pressed steel sheet.

8. The device according to claim 1, wherein during operation, when a cylinder of the log splitter is pushing forward, for each reset spring device, the curved transmission lever further compresses the reset spring through the bearing; and when a handle is released and the log splitter ceases operating, the cylinder is reset by each reset spring device.

* * * * *